United States Patent
Janik et al.

(10) Patent No.: US 10,065,194 B2
(45) Date of Patent: *Sep. 4, 2018

(54) ULTRAFINE NEPHELINE SYENITE

(71) Applicant: Unimin Corporation, New Canaan, CT (US)

(72) Inventors: Jerry William Janik, Bridgenorth (CA); Scott Van Remortel, Bakersville, NC (US)

(73) Assignee: Covia Holdings Corporation, Independence, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,371

(22) Filed: Apr. 22, 2016

(65) Prior Publication Data

US 2016/0236199 A1   Aug. 18, 2016

Related U.S. Application Data

(63) Continuation of application No. 14/693,530, filed on Apr. 22, 2015, now abandoned, which is a (Continued)

(51) Int. Cl.
*B02C 17/18* (2006.01)
*B07B 7/01* (2006.01)
(Continued)

(52) U.S. Cl.
CPC ............ *B02C 17/187* (2013.01); *B02C 17/00* (2013.01); *B02C 17/1845* (2013.01); *B02C 23/08* (2013.01); *B07B 7/01* (2013.01); *C01B 33/26* (2013.01); *C03C 1/004* (2013.01); *C04B 14/14* (2013.01); *C04B 33/04* (2013.01); (Continued)

(58) Field of Classification Search
CPC .............. C01P 2004/51; C01P 2004/53; C01P 2004/61; C01P 2006/12; C01P 2006/60; C01P 2006/62; C01P 2006/63; C01P 2006/64; C04B 2235/3472; C04B 2235/5436; C04B 2235/5481; C04B 33/02

See application file for complete search history.

(56) References Cited

U.S. PATENT DOCUMENTS 2,261,884 A   11/1941   Koenig
2,262,951 A   11/1941   Lyle
(Continued)

FOREIGN PATENT DOCUMENTS

GB   1297622   11/1972
JP   63158246   7/1988
(Continued)

OTHER PUBLICATIONS

Bath, Frank, Article titled Consistent Milling on a Nano Scale, Ceramic Industry, Feb. 2005.
(Continued)

*Primary Examiner* — Shuangyi Abu Ali
(74) *Attorney, Agent, or Firm* — Rankin, Hill & Clark LLP (57) ABSTRACT

A useable particulate nepheline syenite having a grain size to provide an Einlehner Abrasive Value of less than about 100 is described. The particulate nepheline syenite is generally free from agglomeration and moisture free. At least 99% of the nepheline syenite particles have a size less than 10 microns.

5 Claims, 4 Drawing Sheets

Related U.S. Application Data continuation of application No. 14/491,791, filed on Sep. 19, 2014, now abandoned, which is a continuation of application No. 12/948,386, filed on Nov. 17, 2010, now Pat. No. 8,864,900, which is a continuation of application No. 12/080,655, filed on Apr. 4, 2008, now Pat. No. 7,915,188, which is a continuation of application No. 11/703,364, filed on Feb. 7, 2007, now abandoned, which is a continuation of application No. 11/599,514, filed on Nov. 14, 2006, now abandoned.

(60) Provisional application No. 60/830,646, filed on Jul. 13, 2006.

(51) Int. Cl.

| | | |
|---|---|---|
| *C01B 33/26* | (2006.01) | |
| *C04B 33/04* | (2006.01) | |
| *C04B 35/626* | (2006.01) | |
| *B02C 17/00* | (2006.01) | |
| *B02C 23/08* | (2006.01) | |
| *C03C 1/00* | (2006.01) | |
| *C04B 14/14* | (2006.01) | |
| *C09D 7/61* | (2018.01) | |
| *C09D 7/40* | (2018.01) | |
| *C08K 3/34* | (2006.01) | |

(52) U.S. Cl.
CPC ............ *C04B 35/6261* (2013.01); *C09D 7/61* (2018.01); *C09D 7/68* (2018.01); *C09D 7/69* (2018.01); *C01P 2004/61* (2013.01); *C04B 2235/5436* (2013.01); *C04B 2235/5481* (2013.01); *C08K 3/34* (2013.01); *Y10T 428/2982* (2015.01)

(56) References Cited

U.S. PATENT DOCUMENTS

| | | |
|---|---|---|
| 2,269,912 A | 1/1942 | Ladoo et al. |
| 2,478,645 A | 8/1949 | Thiess |
| 2,765,074 A | 10/1956 | Diamond |
| 2,671,132 A | 1/1959 | Hummel |
| 3,044,619 A | 7/1962 | Knolle |
| 3,079,309 A | 2/1963 | Wainer |
| 3,326,701 A | 6/1967 | Von Freyhold |
| 3,389,002 A | 6/1968 | Huffcut |
| 3,486,706 A | 12/1969 | Weyand |
| 3,721,066 A | 3/1973 | Teller |
| 3,904,074 A | 9/1975 | Hoffman et al. |
| 3,917,489 A | 11/1975 | Waters, Jr. |
| 3,998,624 A | 12/1976 | Harris et al. |
| 4,028,289 A | 6/1977 | Brown |
| 4,036,505 A | 7/1977 | Floyd et al. |
| 4,130,423 A | 12/1978 | Chastant et al. |
| 4,183,760 A | 1/1980 | Funk et al. |
| 4,191,671 A | 3/1980 | Kataoka et al. |
| 4,242,251 A | 12/1980 | Aishima et al. |
| 4,396,431 A | 8/1983 | Seeney et al. |
| 4,468,473 A | 6/1984 | Drolet et al. |
| 4,551,241 A | 11/1985 | Saverse et al. |
| 4,639,576 A | 1/1987 | Shoemaker et al. |
| 4,640,797 A | 2/1987 | Goguen |
| 4,663,226 A | 5/1987 | Vajs et al. |
| 4,743,625 A | 5/1988 | Vajs et al. |
| 4,781,671 A | 11/1988 | Pober et al. |
| 4,850,541 A | 7/1989 | Hagy |
| 4,869,786 A | 9/1989 | Hanke |
| 4,871,789 A | 10/1989 | Martinez |
| 4,883,714 A | 11/1989 | Stockl et al. |
| 4,885,832 A | 12/1989 | English |
| 4,979,686 A | 12/1990 | Szegvari et al. |
| 5,066,330 A | 11/1991 | Holcombe, Jr. et al. |
| 5,080,293 A | 1/1992 | Szegvari et al. |
| 5,153,155 A | 10/1992 | Kohut |
| 5,199,656 A | 4/1993 | Szegvari et al. |
| 5,236,499 A | 8/1993 | Chervenak et al. |
| 5,380,356 A | 1/1995 | Gundlach et al. |
| 5,423,490 A | 6/1995 | Zampini |
| 5,530,057 A | 6/1996 | Humphrey et al. |
| 5,686,507 A | 11/1997 | Hermele et al. |
| 5,709,909 A | 1/1998 | Leibfarth et al. |
| 5,866,646 A | 2/1999 | Radosta |
| 5,883,029 A | 3/1999 | Castle |
| 5,961,943 A | 10/1999 | Komatsu et al. |
| 6,074,474 A | 6/2000 | Broome et al. |
| 6,218,012 B1 | 4/2001 | Rota et al. |
| 6,543,710 B2 | 4/2003 | Konetzka et al. |
| 6,569,923 B1 | 5/2003 | Slagter |
| 6,596,837 B2 | 7/2003 | Hogge et al. |
| 6,739,456 B2 | 5/2004 | Svoronos et al. |
| 6,790,904 B2 | 9/2004 | White et al. |
| 6,793,875 B1 | 9/2004 | Shaw et al. |
| 6,905,634 B2 | 6/2005 | Burnell-Jones |
| 7,008,513 B2 | 3/2006 | Davenport et al. |
| 7,751,150 B2 | 7/2010 | Horio |
| 7,757,976 B2 | 7/2010 | Schlesinger et al. |
| 2002/0013401 A1 | 1/2002 | Friel et al. |
| 2002/0137872 A1 | 9/2002 | Schneider et al. |
| 2002/0173384 A1 | 11/2002 | Hogge et al. |
| 2002/0173957 A1 | 11/2002 | Zarnoch et al. |
| 2003/0056696 A1 | 3/2003 | Fenske et al. |
| 2003/0085383 A1 | 5/2003 | Burnell-Jones |
| 2003/0085384 A1 | 5/2003 | Burnell-Jones |
| 2003/0215770 A1 | 11/2003 | Sekino et al. |
| 2003/0224174 A1 | 12/2003 | White et al. |
| 2003/0229157 A1 | 12/2003 | Scheider et al. |
| 2004/0068048 A1 | 4/2004 | Giles et al. |
| 2004/0087433 A1 | 5/2004 | Herold |
| 2004/0175407 A1 | 9/2004 | McDaniel |
| 2005/0019574 A1 | 1/2005 | McCrary |
| 2005/0059765 A1 | 3/2005 | Finch et al. |
| 2005/0167534 A1 | 8/2005 | Tomikawa et al. |
| 2005/0214534 A1 | 9/2005 | Adamo et al. |
| 2006/0068314 A1 | 3/2006 | Kawata |
| 2006/0075930 A1 | 4/2006 | Wang et al. |
| 2006/0078748 A1 | 4/2006 | Ambrose et al. |
| 2006/0081371 A1 | 4/2006 | Duenckel et al. |
| 2006/0140878 A1 | 6/2006 | Cornelius et al. |
| 2006/0160930 A1 | 7/2006 | Schneider |
| 2006/0234026 A1 | 10/2006 | Huusken |
| 2006/0235113 A1 | 10/2006 | Dorgan et al. |

FOREIGN PATENT DOCUMENTS

| | | |
|---|---|---|
| WO | 2005/116137 A1 | 12/2005 |
| WO | 2007/123674 | 11/2007 |

OTHER PUBLICATIONS

Brochure regarding Air Classifiers, Sturtevant, Inc. Copyright 2004.
Brochure regarding Air Classifiers, Sturtevant, Inc. Copyright 1999.
MINBLOC, Physical and Chemical Properties Information Brochure, Oct. 2001.
MINBLOC, Antiblocking Additives, Information Brochure, 2001.
MINBLOC, Antiblocking Additives, Technical Data, Jun. 1988.
International Search Report in connection with International Application Numbr PCT/US2007/015848, Filed Jul. 12, 2007; dated Dec. 6, 2007.
"Nepheline Syenite" from Wikipedia, Sep. 2006.
International Search Report dated Dec. 26, 2007 (Appln. No. PCT/US07/15855; filed Jul. 12, 2007).
Unimin Corporation, Minex Functional Fillers and Extenders Technical Data, May 2001, pp. 1 and 2.
Ibrahim, et al. Dry Magnetic Separation of Nepheline Syenite Ores. May 15, 2002.
C.J. Koenig, "Some Fundamental Properties of Nepheline Syenite"; Journal of the American Ceramic Society; Dec. 1939; vol. 22, issue 1-12, pp. 35-38.

(56) References Cited

OTHER PUBLICATIONS

Union Process, Inc, 2004 Brouchure entitled "Dry Grinding Attritors".
European Search Report dated Jun. 10, 2009 for Appln. No. 07796807.1, filed Jul. 12, 2007 (PCT/US2007/015855).
European Office Action dated Sep. 10, 2009, issued in corresponding European Appln. No. 07796307.1, filed Jul. 12, 2007.
Office action dated Aug. 4, 2014 in corresponding European Application No. 07796807.1, filed Jul. 12, 2007.
U.S. Appl. No. 12/823,313.
U.S. Appl. No. 12/985,035.
U.S. Appl. No. 12/985,071.
U.S. Appl. No. 12/215,643.
U.S. Appl. No. 12/080,655.
U.S. Appl. No. 12/948,386.
U.S. Appl. No. 12/237,628.
U.S. Appl. No. 11/803,093.
U.S. Appl. No. 12/012,884.
U.S. Appl. No. 12/794,879.

ULTRAFINE NEPHELINE SYENITE

This application is a continuation of and claims priority from and benefit of the filing date of U.S. application Ser. No. 14/693,530, filed Apr. 22, 2015 (now abandoned), which is a continuation of and claims priority from and benefit of the filing date of U.S. application Ser. No. 14/491,791, filed Sep. 19, 2014 (now abandoned), which is a continuation of and claims priority from and benefit of the filing date of U.S. application Ser. No. 12/948,386, filed Nov. 17, 2010 (now U.S. Pat. No. 8,864,900) which is a continuation of and claims priority from and benefit of the filing date of U.S. application Ser. No. 12/080,655, filed Apr. 4, 2008 (now U.S. Pat. No. 7,915,188) which is a continuation of and claims priority from and benefit of the filing date of U.S. application Ser. No. 11/703,364, filed Feb. 7, 2007 (now abandoned), which application is a continuation of and claims priority from and benefit of the filing date of U.S. application Ser. No. 11/599,514, filed Nov. 14, 2006 (now abandoned); and U.S. provisional application Ser. No. 60/830,646, filed Jul. 13, 2006, and all of said prior applications are hereby expressly incorporated by reference.

The present invention relates to a novel product obtained by processing of a granular igneous rock and more particularly an improved method of processing nepheline syenite.

BACKGROUND OF INVENTION

In glass and ceramic manufacturing nepheline syenite provides alkalis that act as a flux to lower melting temperature of a glass and ceramic mixture, prompting faster melting and fuel savings. In glass, nepheline syenite also supplies aluminum which gives improved thermal endurance, increases chemical durability and increases chemical durability and increases resistance to scratching and breaking. Furthermore, nepheline syenite is used as a filler or extender in paints, coatings, plastics and paper. It is a desirable material because it contains no free silica and still functions as effectively as a free silica based filler or extender. The material is an inorganic oxide having mechanical characteristics similar to the free silica materials for which it is a substitute. These mechanical properties involve use of a fine grain particulate form of nepheline syenite which is abrasive. Consequently, the granular nepheline syenite has a tendency to abrade and erode rapidly equipment used in processing. It has been determined that by reducing the particle size of any organic oxide material, such as nepheline syenite, the abrasive properties of the material are reduced. It is common to provide nepheline syenite with relatively small particle size for the purpose of allowing effective dispersing in the product aided by use of nepheline syenite. The advantage of dispersing fine grain nepheline syenite in the carrier product is discussed in several patents such as Gundlach U.S. Pat. No. 5,380,356; Humphrey U.S. Pat. No. 5,530,057; Hermele U.S. Pat. No. 5,686,507; Broome U.S. Pat. No. 6,074,474; and, McCrary Publication No. US 2005/0019574. These representative patents showing fine grain nepheline syenite are incorporated by reference herein. They illustrate the advantages of providing this inorganic oxide in a variety of grain sizes for a variety of applications. In U.S. publication 2005/0019574 there is a discussion that microcrystalline silica is a preferred filler in plastics. Silica free silicate is a whole grain sodium potassium alumina silica available from Unimin Corporation, New Canaan, Conn. The particles of the finely divided material range from about 2 to about 60 microns. This material attempts to reduce wear on manufacturing equipment for material employing nepheline syenite as a filler or extender and also for glass manufacturing. In an attempt to accomplish this ultra-fine particle size for nepheline syenite, the granulated material was wetted and then ground in a slurry condition in a micro grinder. Thereafter, the ultra-fine particles were dried by a rotary kiln or other process drier. The ultra-fine particles are highly active and tend to agglomerate in the liquid carrier so that the end result contains agglomerates. Thus, a number of particles had an effective particle size substantially greater than a desired small size. Thus, effectiveness of providing nepheline syenite with a controlled grain size less than 10 microns has been less than satisfactory. Thus, a nepheline syenite product with less than 5 microns was not a commercially viable product. It could only be made in a laboratory by assignee and was not available for any commercial use.

PRIOR ART

As indicated above, nepheline syenite powder has been commercially available for some time; however, the finest grain size for nepheline syenite powder is essentially a grain size of Minex 10 marketed by Unimin Corporation. This powder which was believed to be the ultimate in fine grain for nepheline syenite had a maximum grain size where 99% of the particles were less than a value of about 20-30 microns. The next finest nepheline syenite powder commercially available was a powder such as Minex 7 having a maximum grain size or D99 size approximately the same as Minex 10. However, Minex 7 has a mean particle size D50 of about 5 microns. The two ultra-fine nepheline syenite powders, Minex 10 and Minex 7, define the basic prior art in the art of the present invention. These powders have essentially the same overall maximum grain size but a substantially different mean particle size.

Minex 7 and Minex 10 sized nepheline syenite powder has been used in products since the early 2000's. An example is disclosed in Hermele U.S. Pat. No. 5,686,507, incorporated by reference herein. The product, a non-skid deck coating, utilizes commercially available nepheline syenite powder. There is no indication that a new powder is the filler in this product. From the description of the powder in Hermele, the commercial powder used is a powder like Minex 7 having an upper particle size of greater than 20 microns and a mean particle size D50 of generally 5 microns. This is a target D50 value of 5 microns. The commercially available nepheline syenite powder, such as used in Hermele is the primary prior art to which the present invention is directed. It has a controlled maximum particle size of over 20 microns. The invention involves the development of a powder having drastically reduced maximum grain size. The powder also has a substantially reduced mean grain size. In summary, nepheline syenite powder having a maximum grain size of generally over 20 microns (such as Minex 7 and Minex 10) are the commercial nepheline syenite powder available for use in products and is the prior art to which the present invention is directed.

THE INVENTION

It has been discovered that the combination of a dry ball mill and an air classifier can produce nepheline syenite with more than 99% of the particles having a size of less than 5 microns. This result utilizes a standard fine grain ball mill with an air classifier of standard design, such as illustrated in English U.S. Pat. No. 4,885,832. This patent illustrates a representative air classifier and is incorporated by reference herein. Furthermore, an air classifier as illustrated in the attached brochures from Sturtevant Incorporated can also be used in practicing the present invention. The type of air classifier is not a requirement in the inventive process.

A planetary ball mill to produce particles of nano scale is disclosed in an article by Frank Bath entitled *Consistent Milling on a Nano Scale*. This article is incorporated by reference herein as an appropriate ball mill for producing ultra-fine particles of nepheline syenite. The present invention relates to the method of dry processing a quartz free particulate igneous rock with at least orthoclase and microcline as constituents. Dry processing of particulates including grinding and air classification is disclosed in various prior patents. A representative dry processing system of the prior art is disclosed in Tomikawa 2005/0167534 incorporated by reference herein as background information. The invention relates to the conversion of ultra-fine quartz free particulate matter, such as nepheline syenite, by a method which does not use a wet based process as done in the prior art. The existence of dry systems and the desire to produce ultra-fine particles does not suggest the concept of making the ultra-fine particles by a ball mill combined with an air classifier. The background information is incorporated by reference herein does not teach that concept for producing an igneous rock particulate material such as nepheline syenite with a fine grain and with a restricted particle size range, such as 4-5 microns.

In accordance with the present invention, there is provided a method of processing a useable particulated nepheline syenite. The method includes providing nepheline syenite with a maximum first grain size; milling the nepheline syenite in a ball mill operated substantially dry to produce a feed stock with particles substantially less than a given size; and using an air classifier to remove particles having a second grain size from the feed stock to provide an Einlehner abrasive value of less than 100. Indeed, the value is preferably less than 50. In practice, the second grain size is less than 10 microns and preferably less than 5 microns. The range of grain sizes is about 4-5 microns so the particles are ultra-fine size and concentrated within a limited distribution profile. The first grain size of the feed stock for the present invention is less than 1,000 microns and preferably less than 600 microns of a 25 mesh size.

In accordance with the invention, the nepheline syenite is first ground into particles and sized so that the particles have a maximum grain size. Particles greater than this grain size are separated out and then ground to obtain a desired first grain size. The particles having first grain size are feed stock introduced into a ball mill operated dry to produce ultra-fine particles less than 10 microns and preferably less than 5 microns. The resulting finely ground dry particles are then passed through an air clarifier to separate out the desired particles with a distribution profile of 4-5 microns.

In accordance with the invention, there is provided a nepheline syenite powder having a controlled particle size where at least 99% of the particles of the powder have a particle size of less than 10 microns. This powder is made preferably by milling nepheline syenite in a ball mill operated substantially dry to produce a feedstock and then classifying the feedstock to remove particles greater than the controlled particle size. In accordance with another aspect of the invention, the powder does not have particles of less than about 0.2 microns which constitute "fines" that are removed from the powder during classification.

In accordance with the invention, there is provided a moisture free composition comprising particulate nepheline syenite wherein at least 99% of the particles of the nepheline syenite have a particle size value less than 10 microns. Preferably, 99% of the particles of the nepheline syenite have a grain size of less than about 5 microns. Thus, the D99 particle size for the invention is generally less than 10 microns and preferably about 5 microns. Preferably the D99.9 particle size is less than about 6 microns. Indeed, the novel nepheline syenite powder preferably has at least 99% of the particles of nepheline syenite with a grain size or particle size of less than about 5 microns and generally 4-6 microns.

The primary object of the present invention is the provision of an ultra-fine nepheline syenite powder with a particle size wherein at least 99% of the particles of the powder has a particle size of less than 10 microns. Preferably this is less than about 5 microns or a selectable controlled D99 value between 5-10 microns. This novel powder is made by milling nepheline syenite in a ball mill operated substantially dry to produce a feedstock. Then, the feedstock is classified to remove particles greater than the aforementioned controlled particle size. In accordance with this aspect of the invention, the particles have a minimum size of less than about 0.5 microns and preferably less than 0.2 microns.

Another object of the present invention is making a powder by a method of processing particulate nepheline syenite in a dry system wherein the resulting particle size produces an Einlehner abrasive value less than 100 and preferably less than 50.

Still a further object of the present invention is the provision of a method, as defined above, which method involves providing a feed stock of nepheline syenite with a low grain size conducive to use in a ball mill that is designed to produce an ultra-fine particle size material, such as a ball mill illustrated in the article by Frank Bath entitled *Consistent Milling on a Nano Scale*.

Another object of the invention is the product produced by the novel method.

A further object of the present invention is the provision of a method defined in the appended claims of this application wherein the ultimate grain size is less than 10 microns with a distribution profile of 4-5 microns.

Yet another object of the invention is the production of nepheline syenite with a grain size of less than 5 microns by use of a dry processing system.

These and other objects and advantages will become apparent from the following description taken together with the accompanying drawings.

THE INVENTION

Figure 1:
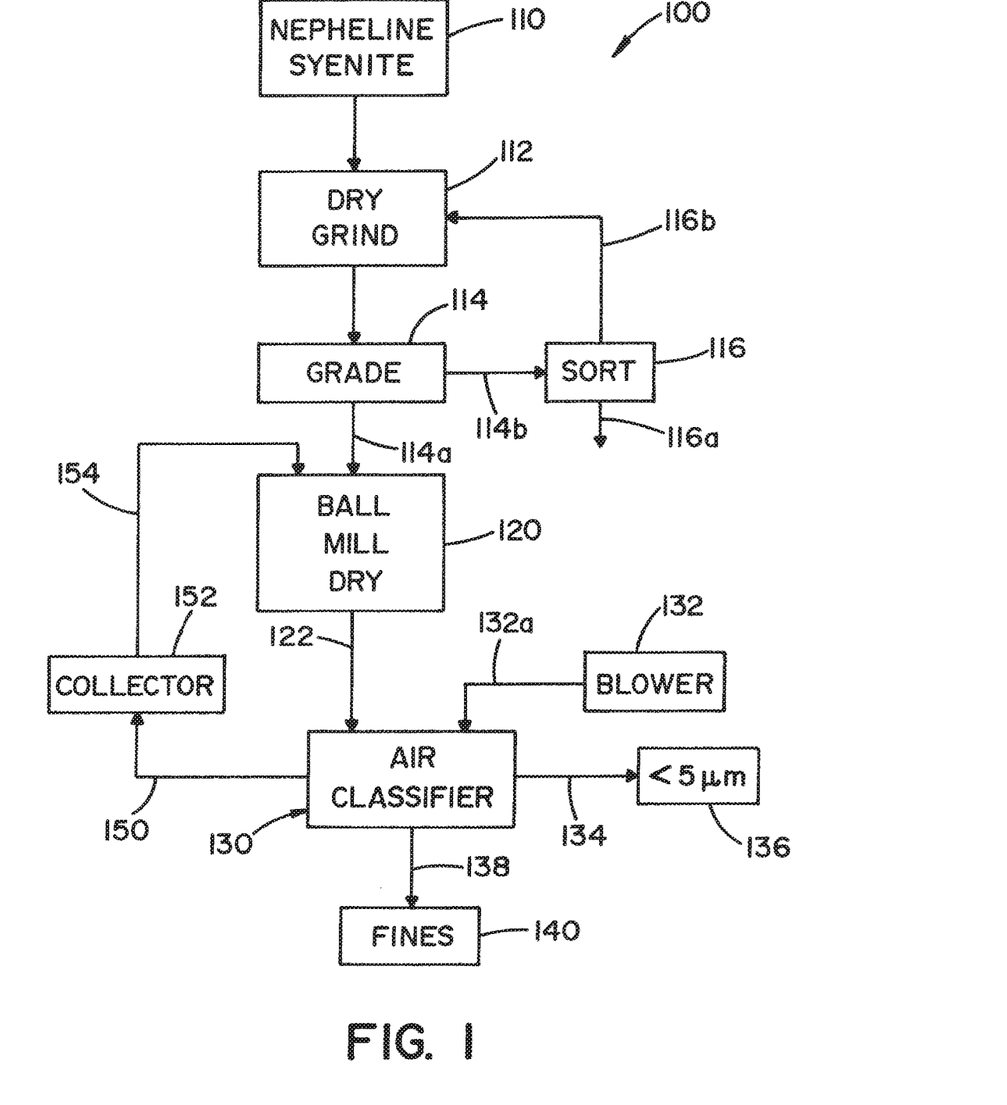
FIG. 1 is a block diagram of the method used in practicing the preferred embodiment of the present invention.

The showings are for the purpose of illustrating the preferred embodiment of the invention and not for the purpose of limiting same, FIG. 1 is a block diagram of a method 100 wherein a particulate nepheline syenite is processed to obtain an ultra-fine grain size less than 10 microns and preferably less than 5 microns. The method is used to control the grain size of the nepheline syenite where at least 99% of the nepheline syenite is below a set selected ultra-fine particle size. Furthermore, the distribution profile is quite narrow, i.e. in the range of 4-5 microns. The invention does not produce particulate nepheline syenite with a large range of particle sizes that merely includes a mixture of ultra-fine particles and larger particles because the abrasive characteristic of the nepheline syenite particles increases drastically with increased particle size. Consequently, the invention involves at least 99% of the particle size being less than a set value, which value is preferably 5 microns. This is a different product than nepheline syenite wherein the particle size distribution profile is in the range of between 2 microns and 11 microns. It has not been practical to obtain a nepheline syenite having substantially greater than 99% of the particles less than 5 microns with a narrow distribution profile. This objective has been accomplished only in experimental environments utilizing a wet milling procedure. Such procedures result in agglomerations of the ultra-fine particles due to surface activity of the small particles. A substantial amount of process energy is required. These limitations have heretofore bode against obtaining such small ultra-fine particles, even though it is known that such particles reduce the Einlehner abrasive value or number.

For the purposes of reducing abrasive properties of materials containing nepheline syenite particles to a low Einlehner Abrasion Value, the nepheline syenite particles must have a grain size less than 10 microns and preferably less than 5 microns. The present invention is a method of processing nepheline syenite which involves the combination of a dry ball mill and an air classifier. A representative method 100 employing the invention is illustrated in FIG. 1 where nepheline syenite in granular form is supplied at first process step 110. The mined particulate material is ground in a dry grinder 112 using standard mechanical equipment so the resulting particles can be within a certain particle size using grading step 114. In the grading step, which can be done by a screen such as a 16 mesh screen, the particles exiting along outlet line 114*a* have a first given value. The first value is in the general range of about 1,000 microns. The use of a mechanical 16 mesh screen in the grading step allows the particles flowing along output line 114*a* to have a size forming optimum feed stock for ball mill 120. If the size of the particles from the dry grinder 112 is greater than the mesh size at step 114, the larger particles are transported along output line 114*b* to sorter 116. At the sorter, larger unusable particles are ejected along output line 116*a* and smaller particles are redirected to the grinder 112 through return line 116*b*. Thus, the inlet portion of method or system 100 produces a given first grain size which is conductive to subsequent processing according to the present invention. This grain size is selected to be 1,000 microns; however, this is only representative and the particles from output line 114*a* can have any particular given particle size. This is the first given grain size in method 100. In practice the graded nepheline syenite at outlet line 114*a* has a grain 25 mesh size (600 micron). Steps 110, 112 and 114 comprise a primary jaw and cone to reduce the mined product to clumps less than 6 inches, rotary kiln to dry the material, a cone crusher to reduce the rock to less than one inch and a tertiary crusher in the form of a vertical shaft impact crusher. The material is then graded to pass a 25 mesh screen and is provided at outlet line 114*a*.

Nepheline syenite having a particular given size in output line 114*a* is directed to a feed stock ball mill process step 120 operated to produce ultra-fine particles, without the addition of a liquid to slurry the particles. Thus, ultra-fine particles are ejected from ball mill of step 120 along output line 122. Any standard ultra-fine ball mill can be used for step 120 of the inventive method. Ultra-fine particles from the ball mill of step 120 exit through output line 122 and are processed by a standard air classifier. This air classifier is adjusted by the process air velocity from blower 132. The blower directs high velocity air through line 132*a* into a standard air classifier step 130. The air classifier step removes particles less than 5 microns by directing such ultra-fine particles through output line 134. These particles can accumulate in collector 136. In accordance with standard air classifier procedure, particles having a maximum grain size of a given second value are separated and directed to collector 136. In accordance with the invention these particles are less than 10 microns and preferably less than 5 microns. In practice, over 99% of the particles have a grain size of about 5 microns in the preferred embodiment of the invention. Of course, air classifiers remove ultra-fine particles with a distribution profile. In the invention, the profile is 5 microns to about 1 micron. The dust with a size less than about 0.5 micron is carried by air from blower 132 through line 138 to be collected in dust receptacle or collector 140. Air classifier 130 also has a large particle discharge line 150 directed to collector 152. From this collector, larger particles are recycled through line 154 back into the input of the ball mill of step 120. Feed stock from line 114*a* and returned particles from line 154 are processed by the dry ball mill step 120 and are directed through output line 122 into standard air classifier 130. The air classifier separates the desired particles for accumulation in collector 136. It also discharges unacceptable small particles into collector 140. Larger particles are recycled through collector 152. Thus, a continuous in-line method 100 accepts mined nepheline syenite and outputs nepheline syenite with ultra-fine particles of less than 10 microns and preferably less than 5 microns. The distribution of particles of nepheline syenite produced by method 100 is in the general range of 1 to 5 microns in the preferred embodiment of the invention. Consequently, a specific low value for the particle size is obtained for the natural mined material nepheline syenite. The distribution profile is less than about 4 microns and has a maximum size in the general range of 5 microns. A distribution profile of 4-5 microns with an upper value less than 10 microns and a lower value of at least 1 micron defines the output material of method 100.

Figure 2:
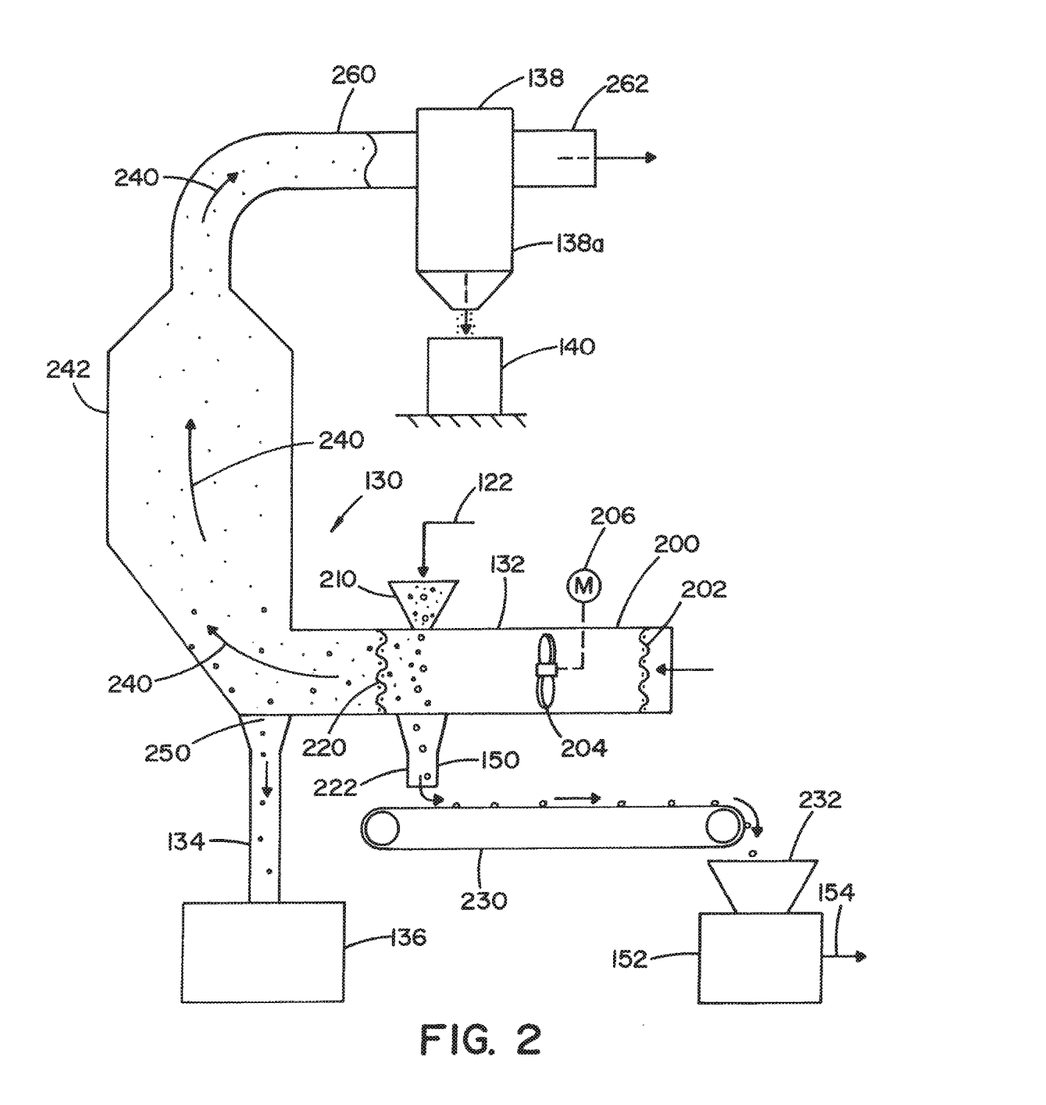
FIG. 2 is a schematic side elevational view representing a simplified air classifier to illustrate the general function of an air classifier in practicing the invention.

The invention involves the combination of a dry ball mill to produce ultra-fine particles without wet grinding in combination using an air classifier, which is a device that removes particles with a certain size range from air borne fine particles. A schematic representation of an air classifier is illustrated functionally in FIG. 2. The particles are discharged directly as feed stock in line 122 into the air classifier 130. Thus, a combination of a dry operated ball mill and an air classifier produces the desired small particle size for the nepheline syenite of the present invention. As illustrated in FIG. 2, a functional representation of an air classifier is shown. Air classifier 130 has an air inlet represented as inlet tunnel 200 for blower 132. Blower 132 can include fan 204 powered by motor 206. Screen 202 prevents large particles of extraneous material from being drawn by the high flow of air in inlet or tunnel 200. In practice, the classifier speed is generally about 4,000 RPM with a total flow of about 6,000 CFM. Such high air velocity through inlet tunnel 200 is directed to an area below hopper 210 for accepting feed stock from line 122. Nepheline syenite is dropped from hopper 210 through inlet tunnel 200 where it is entrapped and carried by air through controlled baffle 220. Larger particles above a given value to be extracted by classifier 130 are discharged by gravity through line 222 which is outlet 150 of method 100 shown in FIG. 1. Such large particles are collected on conveyor 230 where they are transported to collector inlet funnel 232 for discharge into collector 152 for return to the ball mill by way of line 154, as schematically shown in FIG. 1. Air transport currents 240 pass through tunnel or tube 200 into a larger volume hood 242, where the pressure differential and carrying capacity of the air is controlled by the size of the hood compared to the velocity of the particle transporting air. This combination of air and hood allows the transporting air 240 to drop particles of a given size to be extracted in area 250 into outlet line 134 for depositing in collector 136. Thus, large particles are discharged by gravity into collector 152. Particles having the desired distribution range are deposited in collector 136 and other fines or dust smaller than the desired material to be separated by classifier 130 are carried through tube 260 to discharge 138 in the form of funnel 138a for discharging the fines or dust into collector 140. Air is discharged from line 262 as schematically represented in FIG. 2. Thus, the functions of an air classifier are illustrated in FIG. 2 where classifier 130 receives ultra-fine feed stock from line 122. This is the output produced by a dry ball mill used in step 120. The combination of a dry ball mill and an air classifier to provide a selected tight range of ultra-fine particle size for nepheline syenite has not been accomplished before discovery of the present invention.

Figure 3:
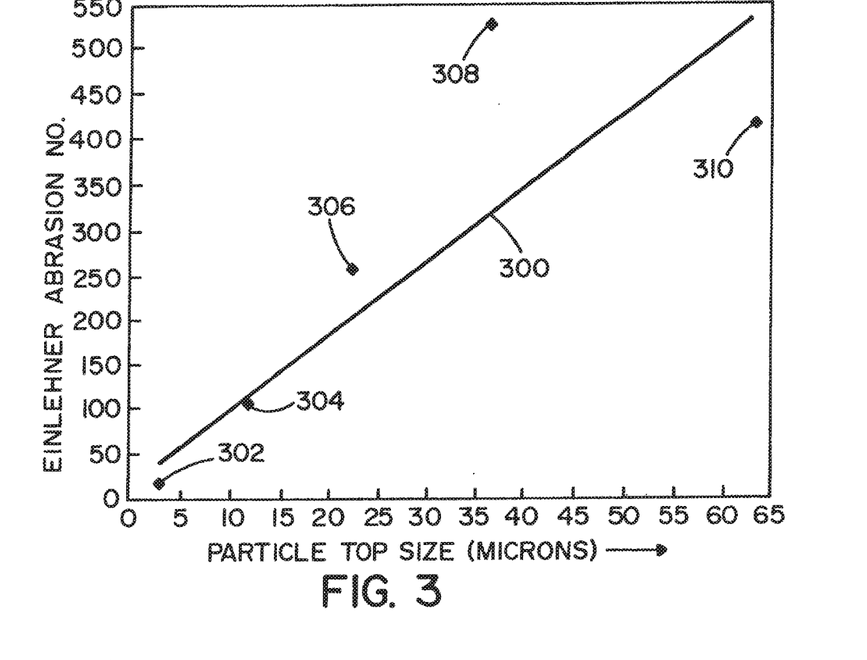
FIG. 3 is a graph of the constructed line representing the relationship between the grain size of nepheline syenite and its abrasive characteristics.

By processing nepheline syenite in accordance with the method of the present invention, it has been found that the Einlehner Abrasive Value (EAV) is less than 100 for a maximum grain size of 10 microns and a value of about 50 for the preferred embodiment wherein the material has a maximum grain size of 5 microns. In FIG. 3, line 300 is the linear regression of points 302, 304, 306, 308 and 310 which are samples of nepheline syenite having maximum particle size of 3 microns, 10 microns, 20 microns, 35 microns and 60 microns, respectively. The abrasion number or value (EAV) for material using these various samples determine the points shown on FIG. 3 to construct line 300 by linear regression. As can be seen, with a maximum grain size of 5 microns, an Einlehner Abrasion number or value of 50 is obtained. At 10 microns, the value or number is 100. Tests have indicated that the lower the abrasion number or value the less wear there is on equipment processing viscous material using nepheline syenite. It is desirable to have a value less than 100 and preferably about 50. This value is obtained by the preferred embodiment wherein the grain size of the processed nepheline syenite is less than 5 microns and generally in the range of 1-5 microns. This is a very small range for the distribution profile and ultra-fine grain size. This produces an improved nepheline syenite heretofore not obtained economically in commercial quantities.

Figure 4:
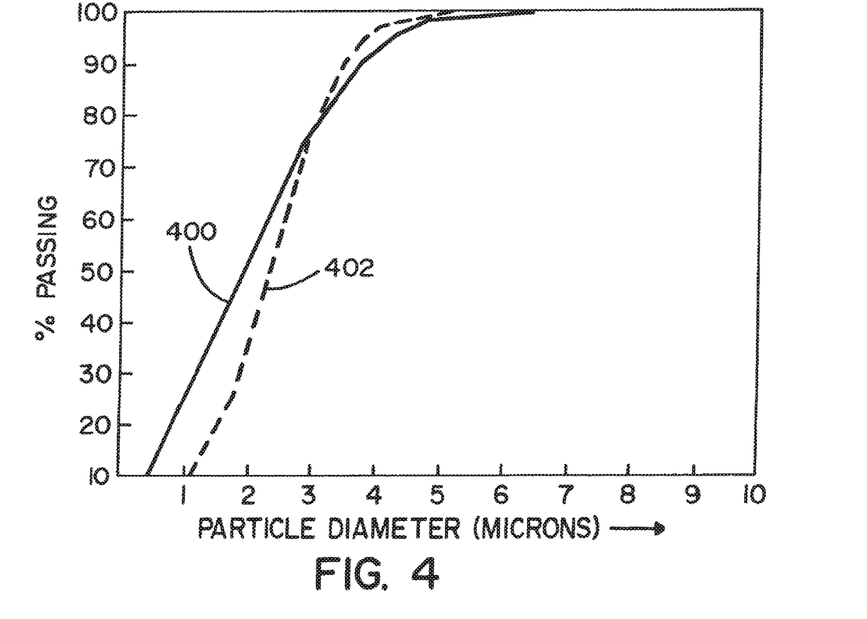
FIG. 4 is a graph comparing the distribution profile obtained between an experimental sub-5 micron product and the sub-5 micron product of the present invention; and, FIG. 5 is a schematic view of the method and equipment used in practicing the preferred embodiment of the invention as shown in FIG. 1.

After producing the product in accordance with the invention as described in the flow chart or diagram of FIG. 1, the resulting product had a maximum grain size D99 of 5 microns and a minimum grain size D5 of about 0.5 microns. The distribution of the finished product is shown in curve 400 in FIG. 4. The particle size distribution of curve 400 shown in FIG. 4 indicates the particle size characteristics of the present invention wherein the nepheline syenite powder has a maximum grain size of about 6 microns and a D99 grain size in the neighborhood of about 5 microns. The D10 particle size is illustrated as about 0.5 microns, thus, 10% of the particle size is less than 0.5 microns. The minimum particle size D5 is substantially less than 0.5 microns. The mean particle size or the D50 particle size is illustrated by curve 400 to be substantially less than 2 microns and between 1.0 and 2.0 microns. Thus, the illustrated embodiment of the present invention disclosed by curve 400 has a maximum grain size D99 of about 5 microns, a minimum grain size of less than about 0.2 microns and a mean D50 grain size of less than 2 microns. This clearly defines the particle size of the nepheline syenite powder produced in accordance with the invention. It is drastically distinguished from any commercially available nepheline syenite powder to be used in products. In summary, the nepheline syenite powder of the present invention has a maximum grain size of less than 10 microns and preferably with a D99 grain size having a value less than 10 microns and preferably about 5 microns. The tested distribution indicates that the minimum grain size is 0.5 microns and only about 10% of the particles had this small size. To obtain a comparison of the distribution obtained by practicing the invention with distribution obtained only by an experimental laboratory process. A sub-5 micron nepheline syenite was produced in a laboratory environment. The distribution curve 402 was obtained for this experimental material having a grain size range of 1-5 microns. This product used a wet process to provide a comparison vehicle. As can be seen, the mass produced high volume commercial application of the present invention illustrated in FIG. 1 produces a distribution curve quite similar to the curve 402 of the experimental material where the particle size are controlled between 5 microns and 1 micron. The only difference is that the mass produced commercial method 100 has a few particles with a lesser diameter than is possible by an experimental, laboratory controlled process for producing a representative sub-5 micron nepheline syenite. Method 100 produces nepheline syenite with an ultra-fine particle size in the range of 0.5-5.0 micron. The method is equally useful for usable quartz free particulate igneous rock with at least orthoclase and microcline constituents. This type of material is used for fillers, extenders and sources of aluminum without the disadvantage of crystalline silicon dioxide.

Figure 5:
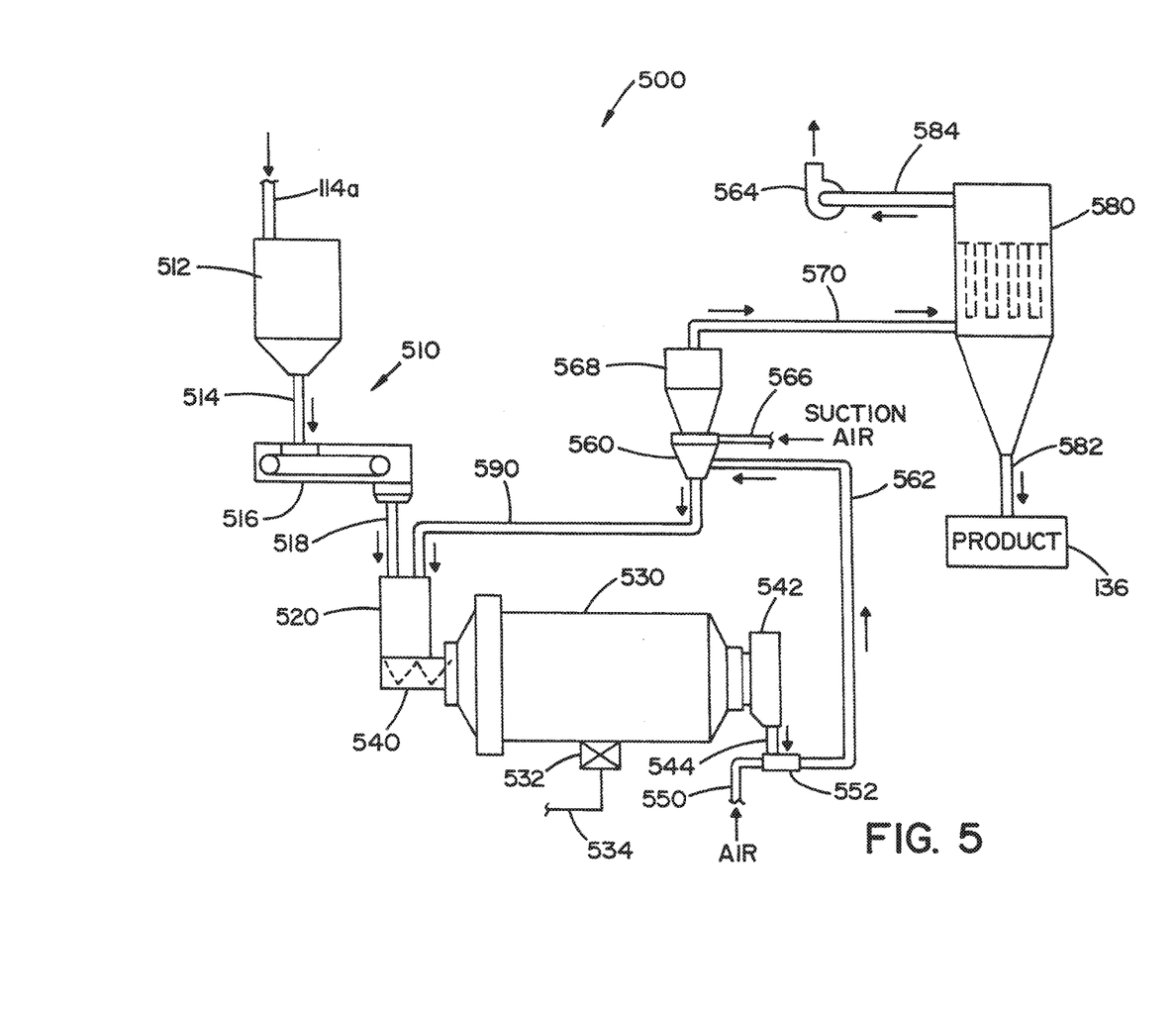

In practice the method of the present invention is performed by system 500 shown in FIG. 5. Nepheline syenite graded to 25 mesh size is provided at line 114a to input mechanism 510. Mechanism 510 comprises hopper or feed bin 512 with output 514 for loading weight feeder 516 from which fresh feed stock is provided by tube 518 to feed box 520. Conventional pebble mill 530 is mounted on a stand having load cell 532 to create a weight signal in line 534 indicating the load weight in mill 530. The rotor of mill 530 includes ceramic particles so the mill grinds the incoming nepheline syenite with a ceramic media. Other media can be used in mill 530, which is referred to as a dry "ball mill." Screw conveyor 540 circulates material from box 520 into mill 530 where the first incoming size is reduced to a substantially smaller size and is moved to output compartment 542 with outlet 544. Forced transport air from line 550 passes through pickup nozzle 552 so material from mill 530 is directed by air into ultrafine air classifier 560 by air line 562. Secondary air from suction line 566 is drawn into the classifier by blower 564. This air, together with transport air from line 562, is the primary air of the classifier and conveys particles upwardly through exhaust 568. Small particles (less than 10 microns and preferably less than about 5 microns) are separated and directed by line 570 to product filter 580. The filter drops the particles into collector 136 by line 582 and expels small particles of dust through line 584. The nepheline syenite from filter 580 has the desired small size less than 10 microns with a range of about 4 microns. Preferably the size is less than 5 microns. With a 4 micron range, the particles are about 1 to 5 microns with the majority closer to 5 microns.

Mill 530 has a circulating load. Larger particles from classifier 560 are directed back to feed box 520 through line 590. Load cell 532 provides a weight signal in line 534. When this signal is indicative of a weight below a set amount, weight feeder 516 provides the needed fresh feed to box 520. In this manner the circulating load is maintained generally constant so the fresh feed equals the discharged small particles.

System 500 is shut down to change product grades. On start up, classifier 560 is operated at 3900 RPM or about 98% of maximum speed and blower 564 is operated at 1500 cfm. The size of the particles is tested as mill 530 is operated, first at low weight and then gradually increased. When the weight is steady at a set value, the system commences automatic control and line 566 is opened to give more primary air. The speed of the classifier is increased as samples are taken periodically until the desired specification is reached. Then the system is operated steady state.

The entire mill has a circulating load measured by cell 532, which is the ratio or percentage of mill discharge versus the fresh feed rate. In practice the circulating load is set to 11-15 TPH. The weight of the mill controls the fresh feed ratio. In steady state, the primary air in line 570 is the sum of secondary air at line 566 and transport air in line 562. Air from line 566 is used to mix the material within the classifier so it is a homogeneous mixture. Air flow is also the opposing force on the classifier wheels and the balance of these forces causes the particle size to exhaust 568. Classifier 560 consists of six parallel ceramic "squirrel cage" like wheels which spin at the same speed. All product must pass through the wheels and the speed of the wheels balanced with the air determines the size of product at collector 136. These parameters are adjusted to obtain the desired particle size. Mill 530 is adjusted to control the set circulating load. Other equipment can be used to perform the invention as claimed. The claims are incorporated by reference as part of this description.

Having thus defined the invention, the following is claimed:

1. An ultra-fine nepheline syenite powder, said powder having a controlled D99 particle size with a value in the range of from about 5 microns to less than 10 microns, where said ultra-fine powder has an uncontrolled mean particle size D50 of less than about 2.0 microns, said powder being essentially free of added moisture.

2. An ultra-fine powder formed a silica deficient igneous rock, said ultra-fine powder being moisture free and having a controlled maximum particle size D99 with a value of less than 10 microns and a mean particle size D50 of less than about 2.0 microns.

3. An ultra-fine powder as defined in claim 2 wherein said silica deficient igneous rock is nepheline syenite.

4. An ultra-fine powder as defined in claim 3 wherein said controlled D99 particle size value is greater than 5 microns.

5. An ultra-fine powder as defined in claim 2 wherein said controlled D99 particle size value is greater than 5 microns.

* * * * *